United States Patent [19]
Chura et al.

[11] Patent Number: 5,793,937
[45] Date of Patent: Aug. 11, 1998

[54] FALLBACK PROCESSING FOR PAGE GENERATION USING MEMORY REDUCTION TECHNIQUES

[75] Inventors: David J. Chura, Redondo; Stephen L. Schafer, Irvine, both of Calif.

[73] Assignee: Peerless Systems Corporation, El Segundo, Calif.

[21] Appl. No.: 623,977

[22] Filed: Mar. 29, 1996

[51] Int. Cl.$^6$ .................................................. G06K 15/00
[52] U.S. Cl. .............................................. 395/115; 395/116
[58] Field of Search .................................. 395/115, 116, 395/101, 112, 113, 114; 382/232, 238, 239, 244; 358/444, 261.4, 404; 341/50, 51, 55, 88

[56] References Cited

U.S. PATENT DOCUMENTS 5,479,587  12/1995  Campbell et al. .................. 395/115

Primary Examiner—Arthur G. Evans
Attorney, Agent, or Firm—Blakely Sokoloff Taylor & Zafman

[57] ABSTRACT

A method and system which enables the printing of all pages that an interpreter of a page description language can image at the highest print quality that can be maintained while ensuring that all pages will print regardless of complexity. A memory manager is responsible for allocation of memory for rendering pages and a fallback manager is responsible for handling memory overflow and video underrun exceptions.

17 Claims, 5 Drawing Sheets

FALLBACK PROCESSING FOR PAGE GENERATION USING MEMORY REDUCTION TECHNIQUES

BACKGROUND OF THE INVENTION

The present invention is an apparatus and method used to perform image rendering which produces complex, high resolution page images for a continuous synchronous raster image output device, such as a laser printer. The method and apparatus form a system which enables the printing of all pages that an interpreter of a page description language can image at the highest print quality that can be maintained while ensuring that all pages will print regardless of complexity.

A continuous synchronous raster image output device requires delivery of the output data in a fixed period of time. If the data is not delivered within the fixed period of time, the output page image is corrupted or will fail to print. The invented method and apparatus in addition to decomposing basic graphics functions into a compact series of orders or commands suitable for realtime processing and then generating the output page image on the fly, performs lossless and lossy compression as needed to image each page to be output, regardless of its complexity.

The invented technique defines the graphic content of a page in much less memory than the rendered image would otherwise require, but in a form that can be processed and delivered to an output device at the speed required by the output device. In order to accomplish this, graphics functions are represented as low level primitives, referred to herein as orders, to guarantee that they can be converted to bitmapped images in realtime. Additionally, the quantity of orders or commands is reduced by eliminating redundant or overlapping graphics functions to minimize the memory used by the orders.

The invention uses a realtime output processor which operates on a small section of the page image at a time. Such a section is called a band. A band consists of a predetermined number of scanlines where each scanline is a series of pixels to be delivered to the output device at the speed required by the output device. After building a first band, a second band is created while the first band is being printed.

The present invention builds upon a prior art technique for imaging for a continuous synchronous raster image output device as disclosed in U.S. Ser. No. 08/277,788 filed Jul. 20, 1994 entitled Method and Apparatus For Displaying A Page With Graphics Information On A Continuous Synchronous Raster Output Device by adding a mechanism which ensures that pages are always printed regardless of complexity, while retaining the highest resolution possible. That is, when using prior art techniques, pages containing complex graphics sometimes cannot be printed because the printer or other device utilized does not have sufficient memory to store the complete bitmap or other representation of the image so that it can be delivered at the speed required by the print engine. When this occurs, it usually is necessary to reduce the resolution, hence the quality of the output, in order to output the image. However, sometimes it is not necessary to reduce the resolution of all pages sent to an output device, but only those pages which contain highly complex graphics. The present invention provides a mechanism which enables the output of documents, regardless of complexity, while retaining the highest print quality possible for each page of the document.

SUMMARY OF THE INVENTION

A method and apparatus forming a system are disclosed which enable the printing of all pages that an interpreter of a page description language can image at the highest print quality that can be maintained while ensuring that all pages will print regardless of complexity.

There are two main components of the invented system: a memory manager, responsible for allocation of memory for rendering pages and a fallback manager, responsible for handling memory overflow and video underrun exceptions.

FIG. 2 shows the various functional modules of the invented system and their relationships to each other. The general flow is from top to bottom, and left to right, beginning with calls to the graphics services interface. A labeled arrow indicates a service is performed by the module.

The graphics services interface module handles the basic interaction with the printer language interpreter, consisting primarily of drawing onto a page. The interpreter must identify the start and end of a particular page, where the graphics services interface initializes a new page instance at start (called New Page) and when completed (called End Page) passes the page to the print engine for inking. There are three major interface modules: new page handling (New Page), end of page handling (End Page) and drawing (Graphics Order Generation).

The New Page module initializes all internal data structures required for drawing to the page. It initializes a memory management module so that it can allocate and configure itself based upon the new page resolution and size.

The End Page module runs when all drawing calls have been completed. This processing includes a final check by a lossy check module and a video underrun predictor. The lossy check module checks for the existence of lossy compressed bands and the predictor predicts possible video underruns before the page is passed to the print engine. Once this is done, End Page tells the print engine driver that the page is available for inking. Subsequently the print engine driver requests actual rendered bands from a rendering/decompression engine module.

The graphics order generation module processes the drawing calls made by the interpreter to generate display list orders. The order generation module is responsible for generating proper orders for each drawing type. Since the actual orders generated are dependent upon the underlying rendering/decompression engine, there is a different order generation module for each target rendering/decompression engine. All of these modules allocate memory for the orders from the graphics memory management module.

The graphics memory management module functions as a memory manager which performs the allocation of space for orders and threads them together into orderlists, one list per band. It manages a unique heap structure, optimized for orderlist storage. A fallback manager module, through a compression engine module, performs the actual process of compressing the orderlists within the heap. Because of this, the memory management module and fallback manager module are coupled tightly, sharing the heap structure.

The video underrun predictor module, at the end of each page, identifies bands that cannot be rendered fast enough for the print engine; the fallback manager module is responsible for simplifying that band's representation so that it can be rendered fast enough. This usually involves pre-rendering the band and compressing it.

The fallback manager module is responsible for handling memory overflows and video underruns by compressing data within the orderlists. Generally it does so using compression of some kind. Thus, it must generate decompression orders.

The compression engine compresses bands and objects under control of the fallback manager.

A rendering/decompression engine module interprets an orderlist, either supported by a hardware graphics rendering engine or directly within this module. This module is capable of generating the entire page or generating only a single band/object as needed by the fallback manager.

DETAILED DESCRIPTION OF THE INVENTION

A method and apparatus forming a graphics subsystem are disclosed which enable the printing of all pages that an interpreter of a page description language can image at the highest print quality that can be maintained while ensuring that all pages will print regardless of complexity.

Figure 1:
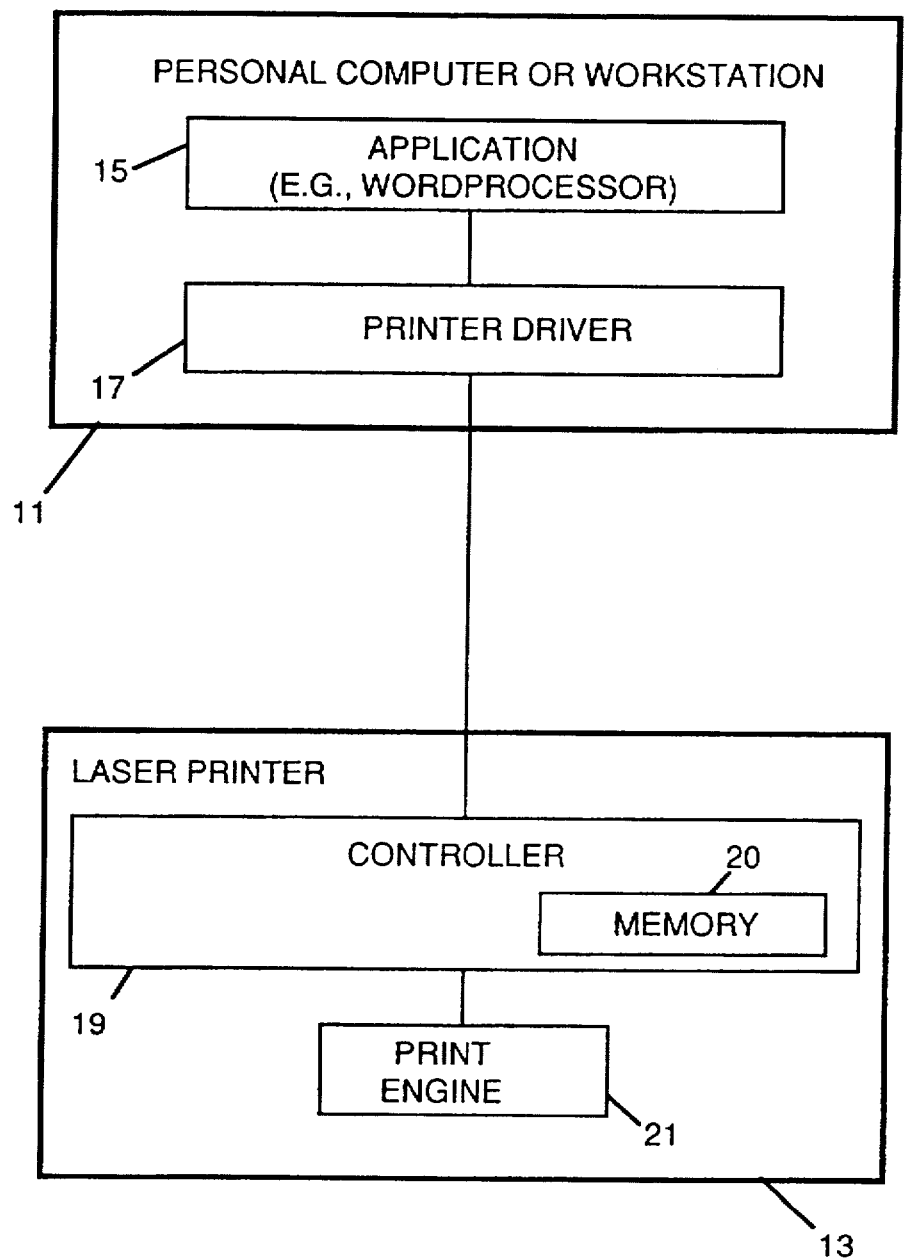
FIG. 1 is a block overview diagram showing a complete system within which the present invention may be used.

Referring to FIG. 1, the invention works in conjunction with a personal computer or workstation 11 to generate an output for a continuous synchronous raster image output device, such as a laser printer 13. An application 15 such as a word processor generates a desired output which is processed by a printer driver 17 to generate commands in a page description language such as Postscript. The page description language commands are passed to the invented graphics subsystem represented as controller subsystem 19, including a memory 20, within the laser printer which converts the commands to a suitable bitmap which is passed to print engine 21 which "inks" a page containing the desired output.

The controller subsystem handles rendering of the page image and delivery of the image to a print engine 21. A graphics service interface is the same regardless of underlying hardware support. Graphics services routines of the graphics services interface within the controller operate in the coordinate system of the target bit image. The origin of the image coordinate system corresponds to the first pixel of the bit image.

Figure 2:
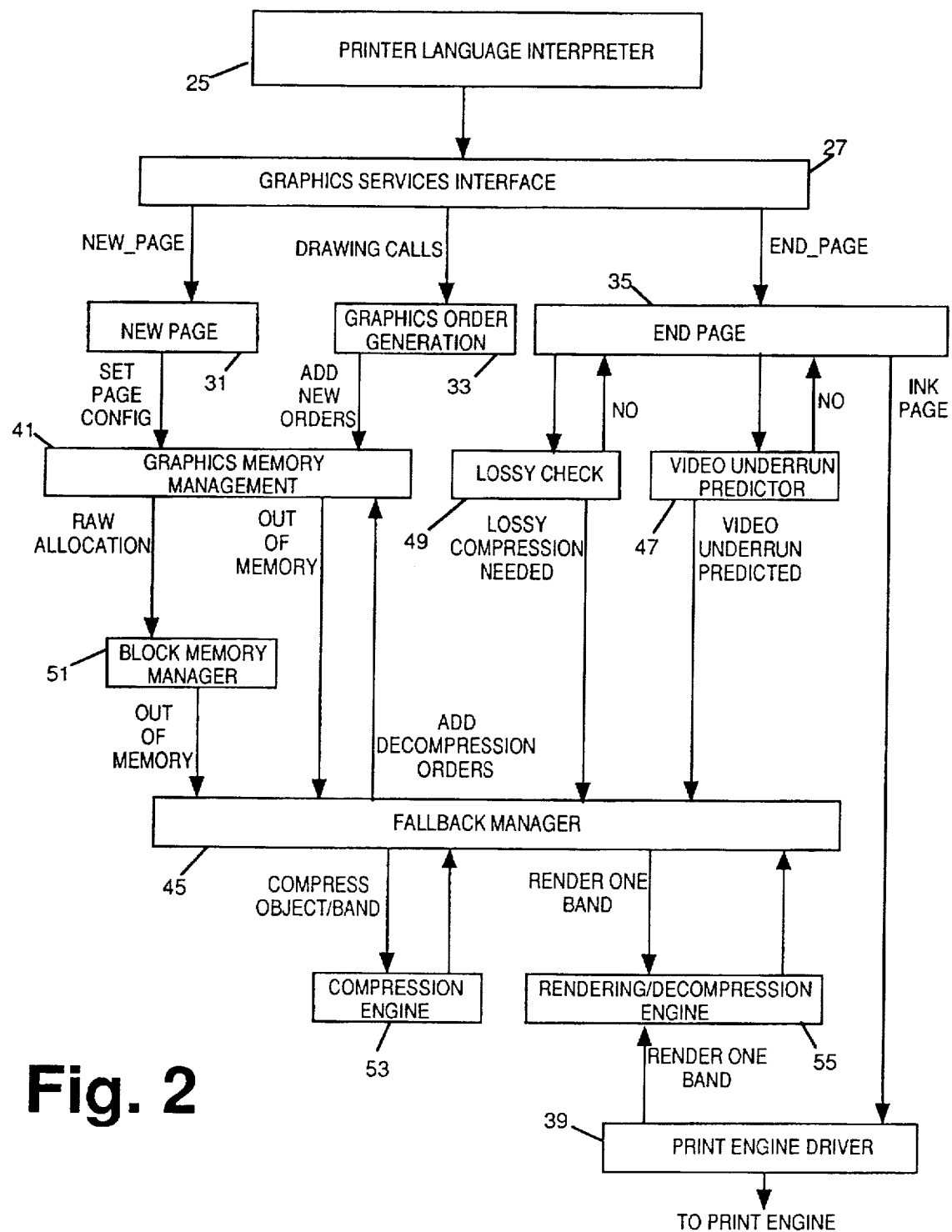
FIG. 2 is a block diagram of the modules of the invented sub-system.

Referring now to FIG. 2, the modules of controller 19 forming the invented graphics subsystem are shown. The output of a printer or page description language interpreter 25 specifies the size of the page image to be printed by giving its width and length. The output of the printer language interpreter also specifies the placement of the image within the physical page by supplying top and left margin parameters, typically expressed in pixels.

Graphics services interface 27 handles two types of calls: calls relating to pages and calls which draw bit images. The draw bit image calls divide into five classes. Generally each class has at least two calls: one for writing to the page image bitmap which the system manages; the other for an interpreter managed destination. These calls are handled by new page module 31, graphics order generation module 33 and end page module 35.

Table 1 shows the various calls made by graphics services interface based on commands from interpreter 25.

TABLE 1

| | |
|---|---|
| DC_GRS_NEWPG | New page |
| DC_GRS_ENDPG | End page |
| DC_GRS_ENDPGF | End page with flags |
| DC_GRS_ABTPG | Abort page |
| DC_GRS_ESC | Emulation state change |
| DC_GRS_2BLIT | 2 operand blit (user destination) |
| DC_GRS_2BLIT2PG | 2 operand blit (page destination) |
| DC_GRS_3BLIT | 3 operand blit (user destination) |
| DC_GRS_3BLIT2PG | 3 operand blit (page destination) |
| DC_GRS_SCAN | Draw scanline (user destination) |
| DC_GRS_SCAN2PG | Draw scanline (page destination) |
| DC_GRS_HTSCAN | Draw scanline halftone (user destination) |
| DC_GRS_HTSCAN2PG | Draw scanline halftone (page destination) |
| DC_GRS_VERT | Draw vertical line (user destination) |
| DC_GRS_VERT2PG | Draw vertical line (page destination) |
| DC_GRS_HTVERT | Draw vertical line halftone (user destination) |
| DC_GRS_HTVERT2PG | Draw vertical line halftone (page destination) |
| DC_GRS_PIX | Draw pixels (user destination) |
| DC_GRS_PIX2PG | Draw pixels (page destination) |
| DC_GRS_HTPIX | Draw pixels halftone (user destination) |
| DC_GRS_HTPIX2PG | Draw pixels halftone (page destination) |
| DC_GRS_ROT90 | Rotate Bitmap 90 degrees (clockwise) |
| DC_GRS_ROT180 | Rotate Bitmap 180 degrees (clockwise) |
| DC_GRS_ROT270 | Rotate Bitmap 270 degrees (clockwise) |
| DC_GRS_RAST2PG | Declare a raster window (page destination) |
| DC_GRS_HTRAST2PG | Declare a halftoned raster window (page destination) |
| DC_GRS_CLOSE_RAST | Close raster window |
| DC_GRS_ROW2PG | Draw raster row (page destination) |
| DC_GRS_HTROW2PG | Draw raster row halftone (page destination) |
| DC_GRS_COL2PG | Draw raster column (page destination) |
| DC_GRS_HTCOL2PG | Draw raster column halftone (page destination) |

The following is a description of the New Page and End Page modules as needed for an understanding of the present invention. The specifics of the individual drawing calls and their handling by graphics order generation module 33 are not needed for an understanding of the invention. For that reason, the drawing calls are described generally and not specifically. A complete implementation of a representative graphics services interface with new page handler, graphics order generation and end page handler may be found in application U.S. Ser. No. 08/277,788 filed Jul. 20, 1994 entitled Method and Apparatus For Displaying A Page With Graphics Information On A Continuous Synchronous Raster Output Device.

New Page.

New Page module 31 defines the page to be generated by subsequent graphics commands. Arguments to this call include the dimensions of the area to be "inked," margins, and options. The graphics subsystem uses the width and length parameters to determine the size of the page image. It uses the top and left margin parameters to inform the print engine driver 39 of the placement of the image within the physical page.

Call:
  ERCODE DC_GRS_NEWPG(ppp, page_taga, options)
  struct GRS_PGPARM *ppp;
  GRST_PAGE_TAG *page_taga;
  PP_UFIX16 options;
Entry:
  ppp = pointer to a page description structure.
  ppp–> pgwidth = scanline size in pixels excluding margins.
  ppp–> pglength = number of scanlines excluding margins.
  ppp–> paper = paper bin selection.
  page_taga = address of a location to contain the returned page

```
tag. This tag is used in all subsequent service requests.
options = option flags:
    GRS_WHITEPG  —> initialize page to white.
    GRS_BLACKPG  —> initialize page to black.
    GRS_NOWAIT   —> do not wait for memory.
    GRS_BOS      —> Back side of sheet. Else, front side of
                    sheet. Only valid for a duplex paper path.
    GRS_PG_MIRROR_Y —> Y-mirror. Else, no Y-mirror.
    GRS_PG_MIRROR_X —> X-mirror. Else, no X-mirror.
Exit:
    DC_GRS_NEWPG0 = Error code.
    E_OK         —> No error.
    E_GRS_FLUSH  —> Printer reset occurred while waiting for
                    resources.
    E_PARAM      —> Parameter error.
    E_BLK_NOBLK  —> Required memory block could not be obtained.
    *page_taga   = the page tag returned by the graphics subsystem.
```

This request declares the caller's intention to begin construction of a new page image. The graphics subsystem allocates certain internal resources and returns a unique page tag for use in subsequent graphics requests. Only one page image can be in progress at any one time.

The page length and width parameters define the dimensions of the image to be constructed. Pixel writing to the page image is clipped to these dimensions.

The options control initialization of the page image memory and the behavior of New Page in the absence of available memory. If the graphics services interface 27 sets a GRS_NOWAIT flag, New Page returns with an error code if it cannot allocate the required memory. If the GRS_NOWAIT flag is zero, New Page waits until resources currently in use become available.

If option flag GRS_PG_MIRROR_Y is one, then the bit image is mirrored through the bit image's Y-axis before it is sent to the print engine driver. If option flag GRS_PG_MIRROR_X is one, then the bit image is mirrored through the bit image's X-axis before it is sent to the print engine driver. The combination of GRS_PG_MIRROR_Y and GRS_PG_MIRROR_X is used to specify a 180 degree rotation of the page. These two options cannot be used individually unless supported by hardware.

End Page

The graphics services interface calls End Page module 35 to inform the graphics subsystem that it has completed processing for the current page. The system prints the page and optionally calls an interpreter completion function when printing is done. If a copy count value (cpycnt) is greater than 1, the completion function is called after the final copy is printed. Should the graphics services interface 27 want to suppress printing of a page, it should call Abort Page.

```
Call:
    ERCODE DC_GRS_ENDG(page_tag, ppx, ppy, cpycnt,
    donefunc, donearg)
    GRST_PAGE_TAG page_tag;
    PIXCOORD ppx;
    PIXCOORD ppy;
    int cpycnt;
    void (*donefunc) ( );
    void *donearg;
Entry:
    page_tag = the page tag returned by NEW_PAGE for this image.
    ppx = x-offset from image to left edge of the paper. Normally this
        parameter is negative.
    ppy = y-offset from image to the top of the paper. Normally this
        parameter is negative.
    cpycnt = the number of copies to print.
```

```
    donefunc = the address of the application completion function or 0
        if none.
    donearg = an arbitrary argument to be passed to any completion
        function.
Exit:
    DC_GRS_ENDPG0 = Error code.
    E_OK         —> No error.
```

The END_PAGE function causes the graphics services interface 27 to inform the print engine driver 39 that a page is available for printing. The END_PAGE request returns immediately after queuing a print request to allow the interpreter to continue to execute during the printing phase. The specified completion function is called when the last image copy has been printed or upon error. The completion routine is called as follows:

```
Call:
    void *routine(donearg, cmp_code)
    void *donearg;
    ERCODE cmp_code;
Entry:
    donearg = the argument supplied to ENDPG.
    cmp_code = a completion code
    E_OK     —> normal completion.
    Error code —> abnormal completion.
```

Graphics Order Generation

Generally drawing calls, which are handled by graphics order generation module 33 expect bitmap descriptors as input. The simplest form of this descriptor contains bit map origin address, bitmap width in pixels, and bitmap height in scanlines. A bitmap descriptor for a halftone pattern has several additional fields giving bit map size in words, destination x origin, and destination y origin.

The destination x and y origin parameters for a halftone specify the origin of the destination within the halftone bitmap. If the halftone bitmap is smaller than the destination, it is replicated in the destination.

A bitmap descriptor is used only during the call. The application can change its contents and reuse it for subsequent calls without affecting previous service requests.

All service requests which write pixels have a "pixop" parameter provided to them. The user specifies Boolean combinations of the pixels involved: destination only, source/destination, halftone/source/destination.

Graphics Memory Management

The purpose of the graphics memory management module 41 is to provide a storage allocation mechanism for graphic orders. It manages a fixed amount of memory in such a way to guarantee that the fallback manager module 45 can take the necessary steps to compress all bands on the page without intermediate storage. The graphics memory management module divides a fixed amount of memory into frames, where each frame is the size required for a compressed band. There is exactly one frame per band, so that when a band is lossy compressed it will be stored in its associated frame. Graphics memory management module 41 keeps a list of all bands occupying memory in each frame. Each band that occupies space in a frame is known as a dependent of the frame. In order to compress a band, the band's frame must have no dependents. The fallback manager uses the dependency information to identify the order in which to compress all bands.

For example, suppose there are 5 bands, and thus 5 frames with the following dependencies:

```
frame 1 has no dependents
frame 2 <- 3      (frame 2 has an orderlist block for band 3)
frame 3 <- 4, 5   (frame 3 has an orderlist block for band
                   4 and one for band 5)
frame 4 has no dependents
frame 5 has no dependents.
```

The dependencies can also be expressed as a set of trees, one per frame, where a dependent is a branch, and a frame with no dependents is a leaf:

Frames 1, 4 and 5 have no dependents thus have no branches. Given the tree structure, the process of compressing all bands is a traversal of all dependency trees, where a leaf identifies compression to be done. After a band is compressed, it is no longer a dependent of any frame, thus is removed from the tree structure. The process of compressing all bands is done by the following sequence (from left to right)::

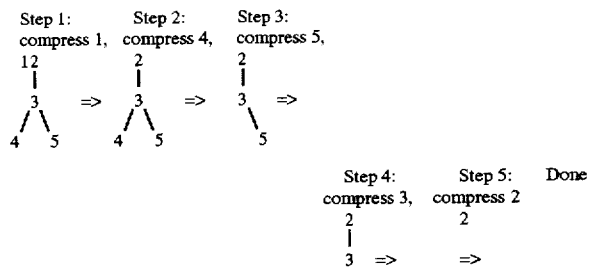

The graphics memory management module must choose frames for allocation such that the dependency trees above are never circular, as in the following example:

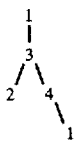

This tree is circular, thus a simple traversal will never end. The graphics memory manager will only allocate memory such that the frame dependency trees are not circular. Given this, the fallback manager can lossy compress the page using the process of dependency tree traversal.

The graphics memory management module 41 is responsible for allocating space for display list orders and their associated data. It differs from the prior art graphics memory management in that it allocates a very large heap upon configuration and manages that heap internally to meet the demands of the all-pages-print environment. When graphics memory management module 41 exhausts its heap, it relies on the fallback manager to compress objects and/or bands to reclaim space. Thus, graphics memory management module and the fallback manager both require access to the heap data structures and content. In addition to the heap, graphics memory management module 41 shares a set of full size band buffers with rendering/decompression engine module 55.

The graphics subsystem is fundamentally a banding system, which utilizes a set of orders to render a page and some band buffers used to ink the page. The memory managed within the graphics subsystem is a heap which holds orders and some number of band buffers. A minimum of two band buffers are required for any configuration. The graphics memory management module determines the heap size and number of band buffers based upon the configuration (duplex setting, resolution and total memory in the printer.

Graphics memory management module 41 allocates all objects from a unique heap structure, optimized for the storage and management of orderlists. A permanent heap of minimum size to print all pages is allocated when the graphics memory management module is configured. When this permanent heap is exhausted, the graphics memory management module will attempt to allocate more memory directly from the block memory manager 51 before calling the fallback manager module. This takes advantage of memory in the printer beyond the minimum. The memory allocated here is used similarly to the permanent heap, but it is known as a temporary heap since it will be given up on demand if other components in the system run out of memory.

Video Underrun Predictor

Video underrun predictor 47 uses a built in metric to determine if the execution of the orders for a band will result in a video underrun. A video underrun occurs when the graphics order generation module 33 cannot execute all the orders within the time necessary to produce the video stream for the continuous synchronous output device. The metric used for prediction may be a simple maximum value for the number of orders that the order execution means can expect to execute in the time allowed. A slightly more complex metric includes a maximum order limit and a maximum memory accesses value.

Using the simple metric, the video underrun predictor reads the order list and compares the number of individual orders for each band to the limit value. If the number of orders for a band exceeds the limit value, then the predictor concludes that execution of the orders for that band will result in a video underrun.

Lossy Check

Lossy check module 49 determines if any band has already been lossy compressed. Under such circumstances, it forces lossy compression of all bands for the current page so that page quality is consistent.

Block memory manager 51 is called by graphics memory management module 41 as noted above when the permanent heap is exhausted. The specifics of a suitable block memory manager are not needed for an understanding of the invention. Functionally, it performs the equivalent of the Unix MALLOC operation.

Compression engine module 53 and rendering/decompression engine 55 perform the actual compression and rendering/decompression as required by fallback manager module 45. The specific implementation details of these modules are not needed for an understanding of the present invention. However, a description of suitable compression and rendering/decompression implementations may be found in co-pending application U.S. Ser. No. 08/324,682 filed Oct. 18, 1994 entitled Bi-level Image Compression By Grayscale Encoding and co-pending application U.S. Ser. No. 08/582,150 filed Jan. 2, 1996 entitled Method and Apparatus For Double Run-Length Encoding Of Binary Data. Other suitable compression methods are available for non-bi-level data.

The specifics of a suitable implementation of print engine driver 39 are not needed for an understanding of the invention. However, such specifics should be readily apparent to a person skilled in the art knowing the specific print engine for which the driver is needed.

Fallback Manager Module

The fallback manager module 45 handles memory overflows and predicted video underruns.

Memory Overflow Solution

A memory overflow may occur during order construction. If so, order construction calls upon the fallback manager to cure the situation by freeing memory. The fallback manager has five methods to remedy a memory overflow. It employs these methods in the order shown below. If the first method solves the problem, then it does not need to proceed to the second method:

1. lossless compression of one or more rasters.
2. lossy compression of all rasters.
3. pre-rendering of a band if the order list is larger than the band.
4. lossless compression of some bands.
5. lossy compression of all bands.

The fallback manager first attempts to remedy a memory overflow by altering the representation of raster objects in the order list, leaving text and line art objects in their current bitmap or scanline table representation. This approach preserves the resolution and print quality of the text and computer drawn (line art) objects. If lossless compression can be applied to reduce the size of rasters, then their quality also is preserved.

If lossy compression must be applied to rasters to obtain the required memory, the quality of the text and computer drawn objects is still maintained. And, the order list still preserves the identity of each object. Once one raster is lossy compressed, all rasters must be lossy compressed to guarantee consistent quality on the page.

If the fallback manager fails to obtain the required memory using methods 1 or 2, then it must free the order list for a band by initiating the execution of the order list to produce a rendered band. This is method 3.

If method 3 is insufficient, the fallback manager proceeds to method 4 and initiates the lossless compression of a band. Quality is still preserved, but the differentiation between object types is lost.

If method 4 is insufficient, the fallback manager proceeds to method 5. Since method 5 alters the band image, any subsequent orders that apply to the lossy band cannot be executed without first decompressing the band. If one band is lossy compressed, all bands must be lossy compressed before printing to guarantee consistent quality across the page. This step can be deferred until END PAGE. Method 5 always succeeds in curing memory overflow.

Video Underrun Solution

After all orders have been constructed, and the interpreter calls END PAGE, END PAGE calls the video underrun predictor to check for potential video underruns. If video underrun is predicted for a band or bands, the fallback manager has three methods to remedy the video underrun. It employs these methods in the order shown below. If the first method solves the problem, then it does not need to proceed to the second method:

1. pre-rendering of bands with predicted video underrun.
2. lossless compression of bands with predicted video underrun.
3. lossy compression of all bands.

In method 1 the fallback manager initiates the execution of the order list for the bands where video underrun is predicted. If there is not enough memory available to complete this process without compression, then the manager proceeds to method 2.

In method 2 the fallback manager initiates lossless compression of one or more of the bands pre-rendered in method 1. The fallback manager iterates between method 1 and 2 until all bands with predicted underruns have been pre-rendered. If lossless compression fails, then the fallback manager proceeds to method 3.

Since the lossy compression used in method 3 guarantees that all bands can be compressed in the available memory, this method cannot fail.

Raster Compression

Raster compression is performed by the compression engine 53 as requested by the fallback manager. The goal of raster compression is to free memory for further order construction while still maintaining the order list.

Lossless Raster Compression

Lossless compression is performed on uncompressed rasters only. The compression is performed by compression engine 53 under the direction of the fallback manager. The fallback manager has a target number of bytes to free and continues compressing rasters until that number of bytes are freed or the lossless compression fails. The fallback manager also attempts to place compressed rasters in the holes or unused memory within the space allocated by the graphics memory manager for the frame where the raster resides. If no unused space or hole is found, then temporary, scratch space is used for the compression output. Once a raster object is compressed, the uncompressed source is freed, creating an unused space or hole for subsequent use if the process continues.

The following rules and precedents apply to the compression process:

1. First compress rasters within the frame or frames that have the largest number of previously uncompressed rasters.
2. Compress rasters adjacent to holes first to create larger holes.
3. Compress rasters from top to bottom of the frame or frames so that sets of rasters are compacted toward the beginning of the frame as holes are created.
4. Compress rasters into scratch space if no hole exists, and then move the compressed output back to the location previously occupied by the uncompressed raster. This creates a hole the size of the difference between the uncompressed raster and the compressed raster.

Lossy Raster Compression

Lossy raster compression operates in the same manner as lossless raster compression except that the result is predictable and cannot fail to achieve compression.

Pre-Rendering of a Band

Pre-rendering of a band consists of executing the order list or a band to produce a printable image of that band. The rendering engine 55 performs this operation. The order list execution is the same as it would be if the band were rendered after END PAGE.

Band Compression

Band compression refers to the compression of a rendered band. That is, the order list for a band must be executed and the resulting band buffer compressed. Rendering engine 55 executes the order list, and compression engine 53 performs the compression. As with raster compression, lossless band compression is tried before resorting to lossy band compression. Once any band is lossy compressed, all bands must be lossy compressed to obtain consistent quality across the page image.

Band compression is used during order construction in response to memory overflow if preferred methods fail or during END PAGE processing if video underrun is predicted. In both cases the goal of band compression is to free the amount of memory required to allow the process to continue.

Lossless Band Compression

If band compression is necessary, lossless band compression is preferred because it maintains print quality and thus does not force the fallback manager to compress all bands. In the memory overflow case band compression frees memory that can be used to accommodate additional orders in the order list in the heap. This can be done in two ways:

1. compress bands until enough space is freed to store the new order.
2. render the new order immediately to a band buffer and compress the band, including the output of the new order.

The first method is the preferred because it can quickly free enough memory to accommodate many new orders. The second method is referred to as band caching, since it essentially caches some number of band buffers on the page (all others are compressed). To work efficiently, new orders must hit the cached bands frequently, else compress/decompress sequences will be frequent. In the minimum memory configuration, only a single cached band is available.

Given that only a single band may be cached, lossless band compression relies primarily on method 1), however it is actually a combination of both. After a band is compressed, its new orderlist has a single decompression order; new orders for that band are simply added to the list as long as there is memory available. If memory runs out, the rendered band buffer requires only that the new orders be rendered. Then the band buffer can be re-compressed, including all new orders (as would be done in method 2). Thus, the algorithm starts out strictly as method 1), but then transitions to method 2), where it may eventually fail when compressed data cannot be fit back into the heap. Lossy band compression begins at that point.

When using band compression to solve a video underrun, the original orderlist must be replaced. Lossless compressed bands may still video underrun. In this instance, the fully rendered band itself is the only lossless representation of the band possible. The band compression algorithm used by compression engine 53 identifies this situation and attempts to free space to accommodate the entire rendered band.

Lossy Band Compression

Transition from lossless band compression to lossy band compression occurs when one of the lossless algorithms of compression engine 53 fails to free the required amount of memory. In lossy band compression, the native frame is used to hold the compressed band. It is known to fit since the frame size is matched to the lossy compression ratio. In addition, no lossy compressed band will have a video underrun. It is the final representation of the page and is guaranteed to be successful by the underlying hardware. The main goal in lossy band compression is to guarantee that all bands can be compressed without deadlock and with the minimum amount of data block copying. Note that lossy band compression begins in a state where there is one band that still will not fit into the heap. This is the starting target for lossy band compression as given by the algorithm below.

The operational aspects of the invention and details regarding the implementation of a suitable fallback manager module for use with the invention will now be described with reference to FIGS. 3, 4 and 5.

Figure 3:
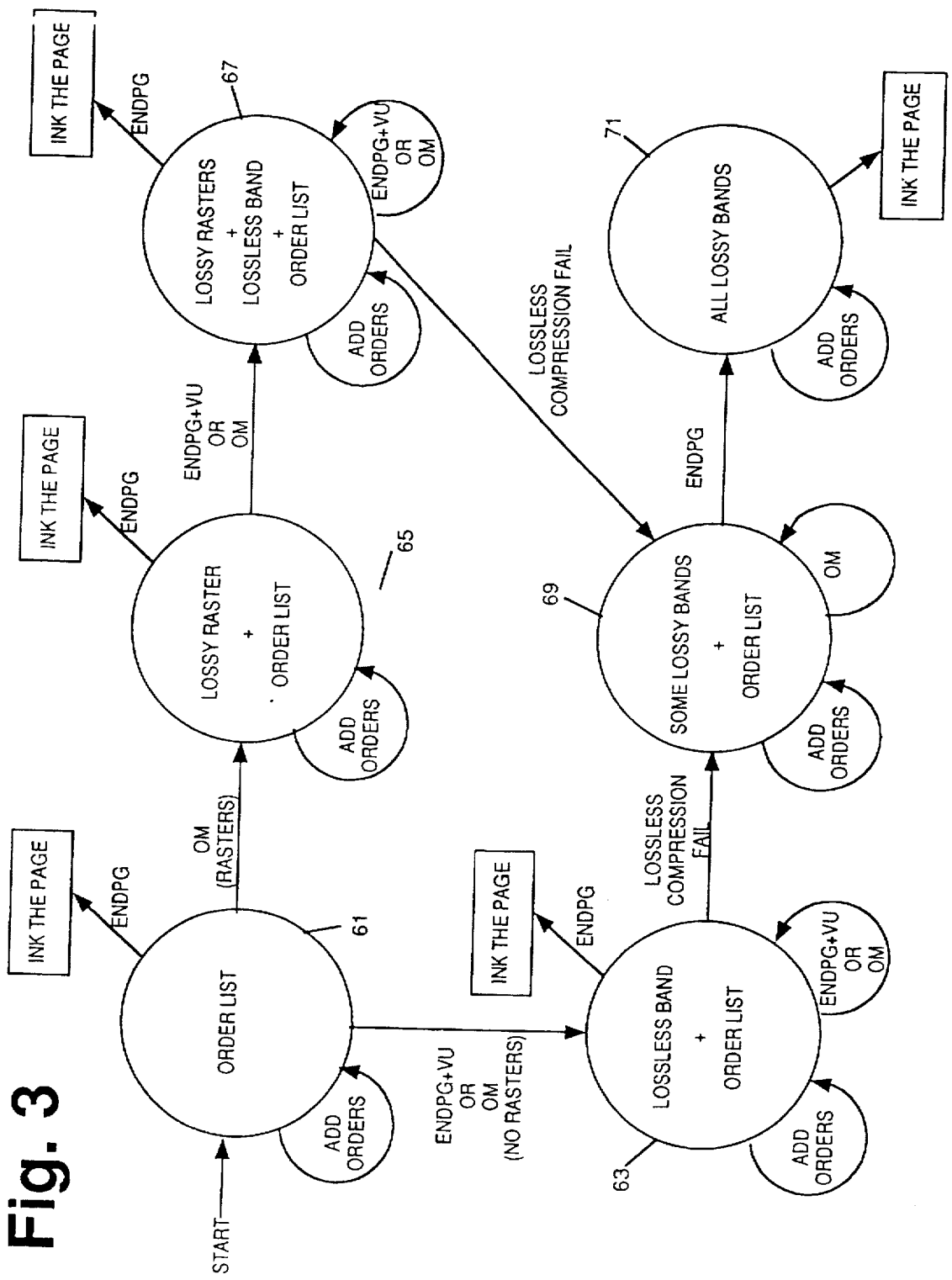
FIG. 3 is a state diagram showing the processing performed by the invented sub-system.

Referring first to FIG. 3, it should be noted that the following abbreviations are used:

ENDPG-Order generation complete

OM-Out of Memory condition detected

VU-Video Underrun predicted

State 61 is the nominal order construction state where orders are added to the order list by graphics order generation module 33 until the printer language interpreter 25 issues an ENDPG command. When ENDPG occurs, a check is made for a potential video underrun. If it is determined by video underrun predictor 47 that a video underrun condition may exist, then a transition is made to state 63.

If an out of memory condition arises, then the order list is checked for rasters. Rasters are arrays of pixel values. Although any image may be represented as rasters, the personal computer or workstation driver 17 (see FIG. 1) typically uses rasters to send a photographic image to a printer. For bi-level images, the pixel values in a raster are one bit each and have a value of 0 or 1. For multi-bit per pixel images, either grayscale or color, the pixel values hav a range from 0 to the maximum value that can be represented in the number of bits per pixel (typically, 16, 64, 256, etc.).

According to the present invention, the interpreter uses the following calls to present rasters to the system:

TABLE 2

| | |
|---|---|
| DC_GRS_RAST2PG | Declare a raster window (page destination) |
| DC_GRS_HTRAST2PG | Declare a halftoned raster window (page destination) |
| DC_GRS_CLOSE_RAST | Close raster window |
| DC_GRS_ROW2PG | Draw raster row (page destination) |
| DC_GRS_HTROW2PG | Draw raster row halftone (page destination) |
| DC_GRS_COL2PG | Draw raster column (page destination) |
| DC_GRS_HTCOLWPG | Draw raster column halftone (page destination) |

If any rasters are present, then there is a transition to state 65. If there are no rasters, a transition is made to state 63.

During state 65, the rasters are compressed to free memory by compression engine 53 and orders continue to be added to the order list by graphics order generation module 33. If an out of memory condition arises, then a transition is made to state 67. A transition is also made to state 67 if a potential video underrun condition is detected at ENDPG by video underrun predictor 47.

During state 67 lossless compression is performed by compression engine 53 to compress one or more bands to free memory. If it succeeds, graphics order generation module 33 continues adding orders to the order list. If the lossless compression produces an overflow in a band buffer, then there is a transition to state 69. In this connection, it should be noted that lossless compression effectiveness varies with the data. In some cases a lossless compression method may produce an output that is larger than the input. This is what causes a lossless compression failure. Lossy compression such as grayscale encoded compression as described in co-pending application Serial No. U.S. Ser. No. 08/324,682 filed Oct. 18, 1994 entitled Bi-level Image Compression By Grayscale Encoding produces a predictably smaller output.

State 63 is entered as noted above. As with state 67, the failure of lossless compression of a band causes a transition to state 69.

State 69 cannot fail as it uses lossy band compression performed by compression engine 53 to guarantee that the page data can fit in memory and can be imaged in realtime. Once this state is reached the entire page will be compressed using lossy compression. However, this final step is deferred until reaching ENDPG. It is more efficient to add to the order list than to decompress the target band buffers and image immediately.

During state 71 the completion of the lossy band compression is taken care of by compression engine 53 and rendering/decompression engine 55.

Lossless compression effectiveness varies with the data. In some cases a lossless compression method may produce an output that is larger than the input.

Figure 4:
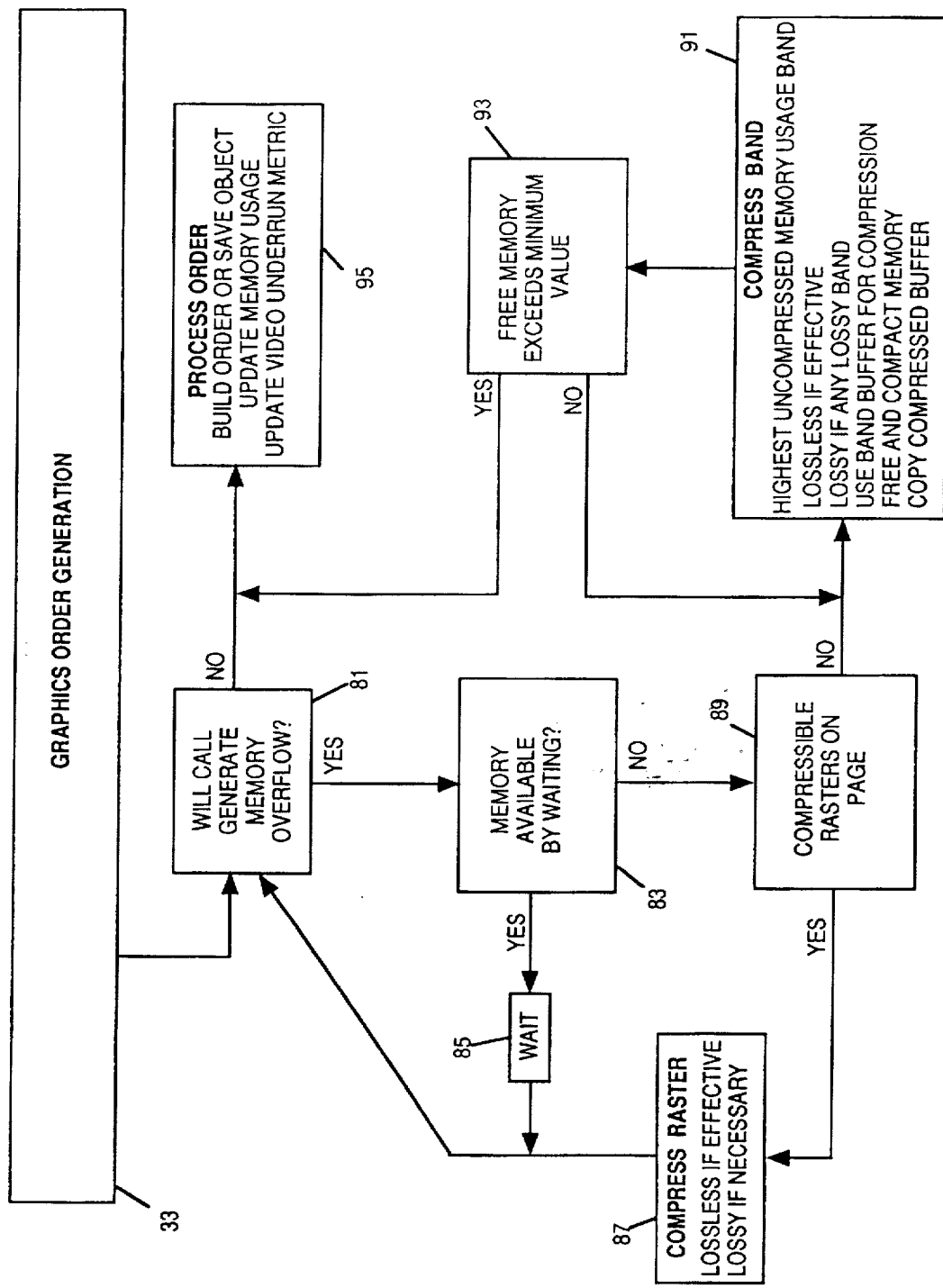
FIG. 4 is a block diagram showing the processing performed by the fallback manager module of the invented sub-system for Graphics Order Generation calls.

FIG. 4 illustrates the flow utilized by fallback manager module 45 for handling memory overflows during graphics order generation processing. If the call will generate a memory overflow as determined by graphics memory management module 41 (block 81), a determination is made whether memory will become available by waiting (blocks 83 and 85). This determination is made by checking for previous pages currently being imaged and printed. If there are previous pages in progress, then memory will become available when they have been inked and output. If there are compressible rasters on the page (block 89), compression engine 53 performs a lossless compression if possible, otherwise it performs a lossy compression (block 91). The determination as to whether or not there are compressible rasters on the page is made by searching the order list for uncompressed asters. If there are no compressible rasters on the page (block 89), compression engine 53 performs a lossless band compression if possible, otherwise it performs a lossy band compression (block 91). After this compression is performed for a band, the fallback manager checks to see if free memory exceeds the minimum value (block 93) required to add the next order. Once free memory exceeds the minimum value, the next order can be processed by graphics order generation module 33 (block 95). If free memory does not exceed the minimum value, further compression is performed (block 91).

Figure 5:
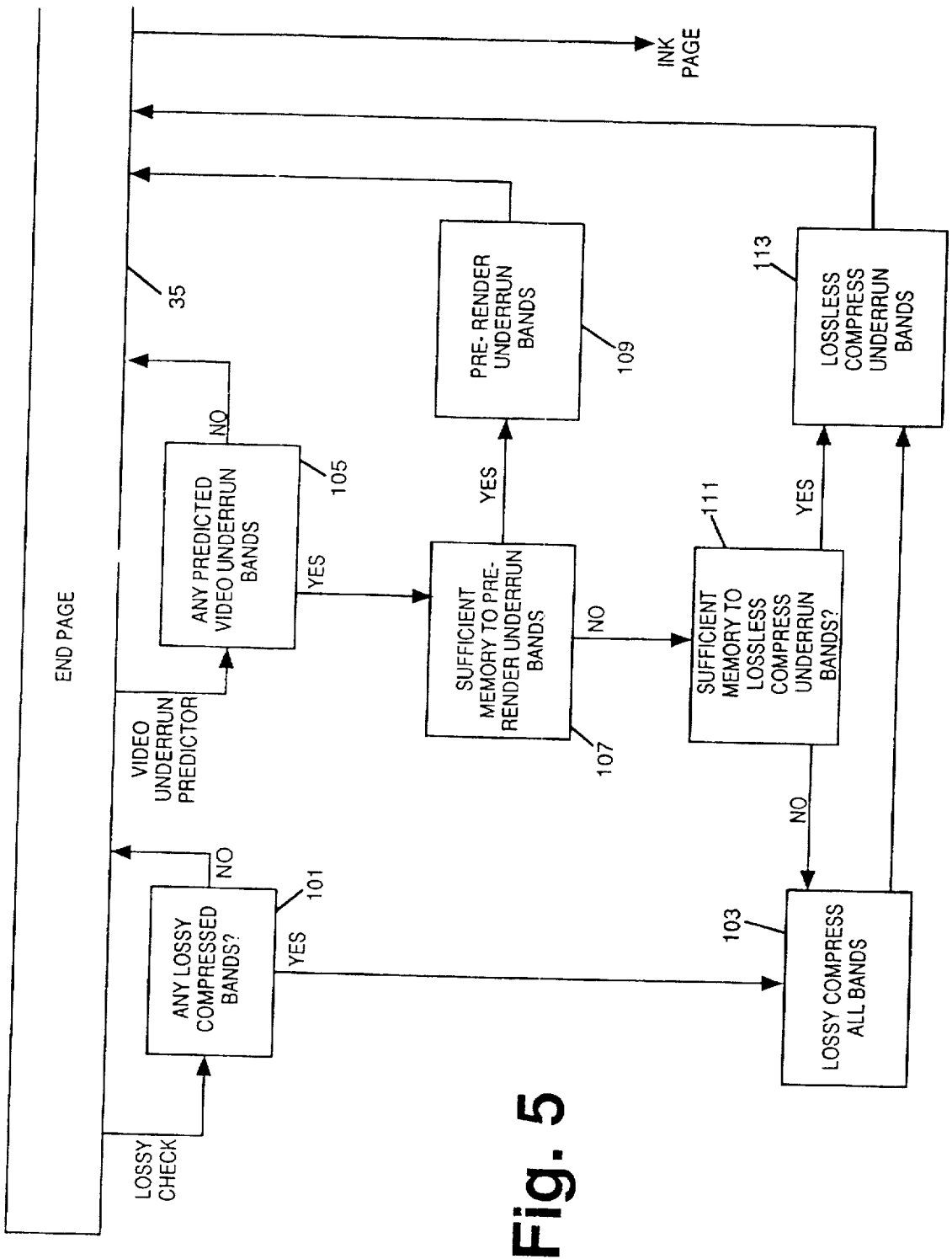
FIG. 5 is a block diagram showing the processing performed by the fallback manager module of the invented sub-system for End Page calls.

FIG. 5 illustrates the flow utilized by fallback manager module 45 for curing potential video underruns during end page processing. If lossy compression of any bands is needed as determined by lossy check 49 (block 101), then compression engine 53 and rendering/decompression engine 55 lossy compress all bands (block 103). Then if video underrun predictor 47 predicts any video underrun bands (block 105), then graphics memory module 41 checks to see if there is sufficient memory to fully image video underrun bands (block 107). If so, compression engine 53 and rendering/decompression engine 55 previously pre-render underrun bands (block 109). If not, the graphics memory management module is used to determine if there is sufficient memory to lossless compress video underrun bands (block 111). If so, then compression engine 53 and rendering/decompression engine 55 lossless compress underrun bands (block 113). If not, then compression engine 53 and rendering/decompression engine 55 lossy compress all bands (block 103).

We claim:

1. A system for generating image data for use by a driver for a continuous synchronous raster image output device from description data produced by a computer program comprising:

a) means for converting said description data to said image data;
 b) a memory coupled to said converting means, said memory storing predetermined portions of said image data in a predetermined format;
 c) means for allocating portions of said memory for use by said converting means;
 d) means for determining whether said memory can store a sufficient quantity of said predetermined portions of said image data without compression for use by said driver to provide said image data at a speed required by said output device;
 e) means for losslessly and lossy compressing said predetermined portions of said image data if said determining means determines that said memory is not sufficient;
 f) means for controlling the operation of said compressing means to ensure that said image data is lossy compressed only when said memory is not sufficient by determining whether said memory is sufficient if said image data is losslessly compressed, wherein said means for allocationing, said means for controlling and said means for determining operate cooperatively to ensure that said image data is always output by said output device while lossy compressing only pages which cannot be losslessly compressed.

2. A system for generating image data for use by a driver for a continuous synchronous raster image output device from description data produced by a computer program comprising:

a) means for receiving commands imbedded in said description data and passing each of said commands as one of a new page command, a drawing command and an end page command;
 b) means for processing said new page commands;
 c) means for processing said drawing commands and generating graphics orders representing bands of said image data;
 d) means for processing said end page commands;
 e) means for storing said bands;
 f) means for managing allocations of said memory means for use by said drawing commands processing means;
 g) means for determining whether compression of said bands by a compression means is needed to store said bands so that they can be provided to said driver at a speed required by said output device, said compression means for losslessy and lossy compressing said bands;
 h) means for controlling said managing means and said compression means to ensure that said bands are lossy compressed only when said memory means is not sufficient to store said bands when losslessy compressed at said speed required by said output device, wherein said means for allocationing, said means for controlling and said means for determining operate cooperatively to ensure that said image data is always output by said output device while lossy compressing only pages which cannot be losslessly compressed.

3. The system defined by claim 1 wherein the system proceeds with a lossy compression only if sufficient memory will not become available by waiting for previously processed image date to be output by said output device.

4. The system defined by claim 1 wherein said means for converting comprises an interface which processes page description language calls and converts said calls into a form enabling the creation of said predetermined format.

5. The system defined by claim 1 wherein said means for determining comprises a module which operates to execute an order list for bands for which a video underrun is predicted to determine whether a sufficient amount of memory exists to complete said execution.

15

6. The system defined by claim 1 wherein said means for controlling comprises a module adapted to process memory overflows and predicted video underruns.

7. The system defined by claim 2 wherein said end page commands processing means comprises a state machine including an orderlist state, a lossy raster plus orderlist state, a lossy raster plus lossless band plus orderlist state, a lossless band plus orderlist state, an all lossy bands state and a pre-rendered bands state.

8. The system defined by claim 2 wherein said means for receiving comprises an interface which processes page description language calls and converts said calls into a form usable by said means for processing said new page commands, said means for processing said drawing commands and generating graphics orders and said means for processing said end page commands.

9. The system defined by claim 2 wherein said means for processing said new page commands comprises a module which defines a page to be generated by subsequent graphics commands.

10. The system defined by claim 2 wherein said means for processing said drawing commands and generating graphics orders comprises a module which converts bitmap descriptors into graphics orders.

11. The system defined by claim 2 wherein means for storing comprises a random access memory.

12. The system defined by claim 2 wherein said means for managing comprises a module which operates to produce bands of graphics information represented as display list orders and their associated data and manages a preconfigured heap to ensure that all pages of said image data to be output are output to said output device.

13. The system defined by claim 2 wherein said means for determining comprises a module which operates to execute an order list for bands for which a video underrun is predicted to determine whether a sufficient amount of memory exists to complete said execution.

14. The system defined by claim 2 wherein said means for controlling comprises a module adapted to process memory overflows and predicted video underruns.

16

15. The system defined by claim 2 wherein the system proceeds with a lossy compression only if sufficient memory will not become available by waiting for previously processed image date to be output by said output device.

16. A method for generating image data for use by a driver for a continuous synchronous raster image output device from description data produced by a computer program comprising the steps of:
  a) receiving commands imbedded in said description data and passing each of said commands as one of a new page command, a drawing command and an end page command;
  b) processing said new page commands;
  c) processing said drawing commands and generating graphics orders representing bands of said image data;
  d) processing said end page commands;
  e) storing said bands;
  f) managing allocations of said memory means for use by said drawing commands processing means;
  g) determining whether compression of said bands by a compression means is needed to store said bands so that they can be provided to said driver at a speed required by said output device, said compression means for losslessy and lossy compressing said bands;
  h) controlling said managing means and said compression means to ensure that said bands are lossy compressed only when said memory means is not sufficient to store said bands when losslessy compressed at said speed required by said output device, and sufficient memory will not become available by waiting for previously processed image date to be output by said output device.

17. The method defined by claim 16 further comprising the step of proceeding with a lossy compression only if sufficient memory will not become available by waiting for previously processed image date to be output by said output device.

\* \* \* \* \*